US009710716B2

(12) United States Patent
Case et al.

(10) Patent No.: US 9,710,716 B2
(45) Date of Patent: Jul. 18, 2017

(54) COMPUTER VISION PIPELINE AND METHODS FOR DETECTION OF SPECIFIED MOVING OBJECTS

(71) Applicant: Sighthound Inc., Winter Park, FL (US)

(72) Inventors: Ryan Case, Menlo Park, CA (US); Syed Zain Masood, Orlando, FL (US); Guang Shu, Winter Park, FL (US); Enrique G. Ortiz, Oviedo, FL (US); Stephen Neish, Winter Park, FL (US)

(73) Assignee: Sighthound, Inc., Winter Park, FL (US)

( * ) Notice: Subject to any disclaimer, the term of this patent is extended or adjusted under 35 U.S.C. 154(b) by 23 days.

(21) Appl. No.: 14/969,693

(22) Filed: Dec. 15, 2015

(65) Prior Publication Data
US 2016/0171311 A1 Jun. 16, 2016

Related U.S. Application Data

(60) Provisional application No. 62/092,667, filed on Dec. 16, 2014.

(51) Int. Cl.
*G06K 9/00* (2006.01)
*G06T 7/254* (2017.01)
(Continued)

(52) U.S. Cl.
CPC ..... *G06K 9/00805* (2013.01); *G06K 9/00221* (2013.01); *G06K 9/00261* (2013.01);
(Continued)

(58) Field of Classification Search
CPC .......... G06K 9/00771; G06K 9/00778; G06K 9/00791; G06K 9/00805; G06K 9/00838;
(Continued)

(56) References Cited

U.S. PATENT DOCUMENTS 5,802,220 A * 9/1998 Black .................. G06K 9/00248
382/100
5,812,787 A * 9/1998 Astle .................... H04N 19/503
348/586

(Continued)

OTHER PUBLICATIONS

Cheng et al., "Real-Time Discriminative Background Subtraction," IEEE Transactions on Image Processing, 20(5). pp. 1401-1414. Oct. 18, 2010.

(Continued)

*Primary Examiner* — Manav Seth
(74) *Attorney, Agent, or Firm* — Davis Wright Tremaine LLP; Philip H. Albert

(57) ABSTRACT

A computer vision pipeline detects tracks and classifies people or other specified class of objects in a steam of video. The ability to not only detect motion, but to distinguish people or other specified objects, can improve the systems usefulness in applications like security monitoring. A motion detection module provides a motion bitmap and a background subtraction module provides a foreground bitmap, and an object tracking module uses these bitmaps identify and track the specified classes of objects. From these objects and tracks, categorized object data can then be generated.

26 Claims, 4 Drawing Sheets

Computer Vision Pipeline

(51) Int. Cl.
*G06T 7/215* (2017.01)
*G06T 7/194* (2017.01)

(52) U.S. Cl.
CPC ..... *G06K 9/00342* (2013.01); *G06K 9/00771* (2013.01); *G06K 9/00778* (2013.01); *G06K 9/00791* (2013.01); *G06T 7/194* (2017.01); *G06T 7/215* (2017.01); *G06T 7/254* (2017.01); *G06T 2207/10024* (2013.01); *G06T 2207/30196* (2013.01)

(58) Field of Classification Search
CPC ........... G06K 9/00221; G06K 9/00261; G06K 9/00342; G06K 9/00348; G06K 9/00362; G06K 9/00718; G06T 7/215; G06T 7/194; G06T 7/254; G06T 7/285; G06T 7/55; G06T 2207/10024; G06T 2207/30196
See application file for complete search history.

(56) References Cited

U.S. PATENT DOCUMENTS

| | | | | |
|---|---|---|---|---|
| 6,795,567 | B1* | 9/2004 | Cham | G06T 7/251 382/103 |
| 7,142,600 | B1* | 11/2006 | Schonfeld | H04N 19/51 375/240.16 |
| 7,199,798 | B1* | 4/2007 | Echigo | G06F 17/30259 345/473 |
| 7,200,266 | B2* | 4/2007 | Ozer | G06K 9/00335 382/100 |
| 7,460,689 | B1* | 12/2008 | Chan | G06K 9/3241 375/240.16 |
| 7,620,204 | B2* | 11/2009 | Porikli | G06K 9/32 382/103 |
| 7,783,118 | B2* | 8/2010 | Zhou | H04N 5/145 348/154 |
| 8,036,494 | B2* | 10/2011 | Chen | G06T 3/4053 382/298 |
| 8,116,527 | B2* | 2/2012 | Sabol | G06T 7/254 348/61 |
| 8,165,345 | B2* | 4/2012 | Chau | A61F 4/00 348/155 |
| 8,213,679 | B2* | 7/2012 | Yao | G06K 9/00785 348/169 |
| 8,243,987 | B2* | 8/2012 | Hampapur | G06K 9/00771 382/103 |
| 8,306,267 | B1* | 11/2012 | Gossweiler, III | G06K 9/00241 382/103 |
| 8,416,993 | B2* | 4/2013 | Springer | G06T 7/215 382/107 |
| 8,447,069 | B2* | 5/2013 | Huang | G06T 7/254 382/103 |
| 8,565,481 | B1* | 10/2013 | Smith | G06K 9/00214 348/169 |
| 2006/0227862 | A1* | 10/2006 | Campbell | G06K 9/00778 375/240 |
| 2008/0037869 | A1* | 2/2008 | Zhou | H04N 5/145 382/173 |
| 2015/0186713 | A1* | 7/2015 | Cao | G06K 9/00342 382/103 |
| 2016/0042621 | A1* | 2/2016 | Hogg | G08B 13/19604 348/155 |

OTHER PUBLICATIONS

Dalal et al., "Histograms of oriented gradients for human detection," IEEE Computer Society Conference on Computer Vision and Pattern Recognition, 2005. vol. 1. pp. 886-893. Jun. 25, 2005.

Déniz et al., "Face recognition using Histograms of Oriented Gradients," Pattern Recognition Letters, 32(12). pp. 1598-1603. Sep. 2011. Published ahead of print Jan. 20, 2011.

Felzenszwalb et al., "A discriminatively trained, multiscale, deformable part model," IEEE Conference on Computer Vision and Pattern Recognition, 2008. pp. 1-8. Jun. 23-28, 2008.

Felzenszwalb et al., "Cascade Object Detection with Deformable Part Models" 2010 IEEE Conference on Computer Vision and Pattern Recognition (CVPR). pp. 2241-2248. Jun. 13-18, 2010.

Friedman et al., "Image Segmentation in Video Sequences: A Probabilistic Approach," Proceedings of the Thirtheenth Conferences on Uncertainty in Artificial Intelligence. pp. 175-181. Aug. 1997.

Gao, "An Improved HOG Based Pedestrian Detector," Foundations and Practical Applications of Cognitive Systems and Information Processing, Advances in Intelligent Systems and Computing, 215. Proceedings of the First International Conference on Cognitive Systems and Information Processing, Beijing, China, Dec. 2012. pp. 577-590. 2014.

Girshick et al., "Object Detection with Grammar Models," Advances in Neural Information Processing Systems, 24. pp. 442-450. 2011.

Girshick et al., "Rich Feature Hierarchies for Accurate Object Detection and Semantic Segmentation," The IEEE Conference on Computer Vision and Pattern Recognication (CVPR). pp. 580-587. Jun. 23-28, 2014.

Girschick "Fast R-CNN," IEEE International Conference on Computer Vision (ICCV), 2015. pp. 1440-1448. Dec. 7-13, 2015.

Krizhevsky et al., "ImageNet Classification with Deep Convolutional Neural Networks," Advances in Neural Information Processing Systems. pp. 1097-1105. 2012.

Lecun et al., "Gradient-based learning applied to document recognition," Proceedings of the IEEE, 86(11). pp. 2278-2324. Nov. 1998.

St-Charles et al., "Flexible Background Subtraction With Self-Balanced Local Sensitivity," 2014 IEEE Conference on Computer Vision and Pattern Recognition (CVPR). pp. 408-413. Jun. 23-28, 2014.

Wang et al., "An HOG-LBP Human Detector with Partial Occlusion Handling," 2009 IEEE 12th International conference on Computer Vision. pp. 32-39. Sep. 29-Oct. 2, 2009.

* cited by examiner

COMPUTER VISION PIPELINE AND METHODS FOR DETECTION OF SPECIFIED MOVING OBJECTS

CROSS-REFERENCE TO RELATED APPLICATION

This application claims priority from U.S. Provisional Application No. 62/092,667, filed on Dec. 16, 2014, which is hereby incorporated in its entirety by this reference.

BACKGROUND

The followings presents devices, systems and methods that use computer vision technology to detect, track and classify people and objects and is useful in applications like security monitoring.

While motion detection software is useful in telling a camera when to start recording, its inability to know what it was seeing and distinguish between classes of objects can lead to many hours of wasted footage and false notifications. Consequently, such system would benefit by improvements in their ability to detect and differentiate, for example, people from animals, vehicles, or other objects. This could significantly reduce the number of false positives and unnecessary alerts sent to users, which can make even the most modern security cameras unusable.

SUMMARY OF THE INVENTION

In operating a computer vision system, a vision data interface receives a set of vision data and provides a series of video frames derived from the vision data. A motion detection module constructs a motion bitmap from the series of video frames, and a background subtraction module constructs a foreground bitmap from the series of video frames. From a comparison of the motion bitmap and foreground bitmap, an object tracking module identifies one or more regions within the series of frames, each corresponding to an object of a specified category, and tracks the one or more regions across multiple frames of the series of video frames. From the tracked regions, an object categorizer module determines whether each of the identified regions includes an object of the specified category.

A computer vision system includes a vision data interface, a motion detection module, a background subtraction module, an object tracking module, and an object categorizer module. The vision data interface is connectable to receive a set of vision data at and provide a series of video frames derived from the vision data. The motion detection module is connected to the vision data interface to receive the series of video frames and construct from them a motion bitmap. The background subtraction module is connected to the vision data interface to receive the series of video frames and construct from them a foreground bitmap. The object tracking module is connected to receive the motion bitmap and the foreground bitmap and, from a comparison of the motion bitmap and foreground bitmap, identify one or more regions within the series of frames each corresponding to an object of a specified category and track the one or more regions across multiple frames of the series of video. The object categorizer module determines from the tracked regions whether each of the identified regions includes an object of the specified category.

Various aspects, advantages, features and embodiments are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION

The following considers a computer vision pipeline to detect, track and classify people or other specified class of objects in a steam of video. The ability to not only detect motion, but to distinguish people or other specified objects, can improve the systems usefulness in applications like security monitoring.

Figure 1:
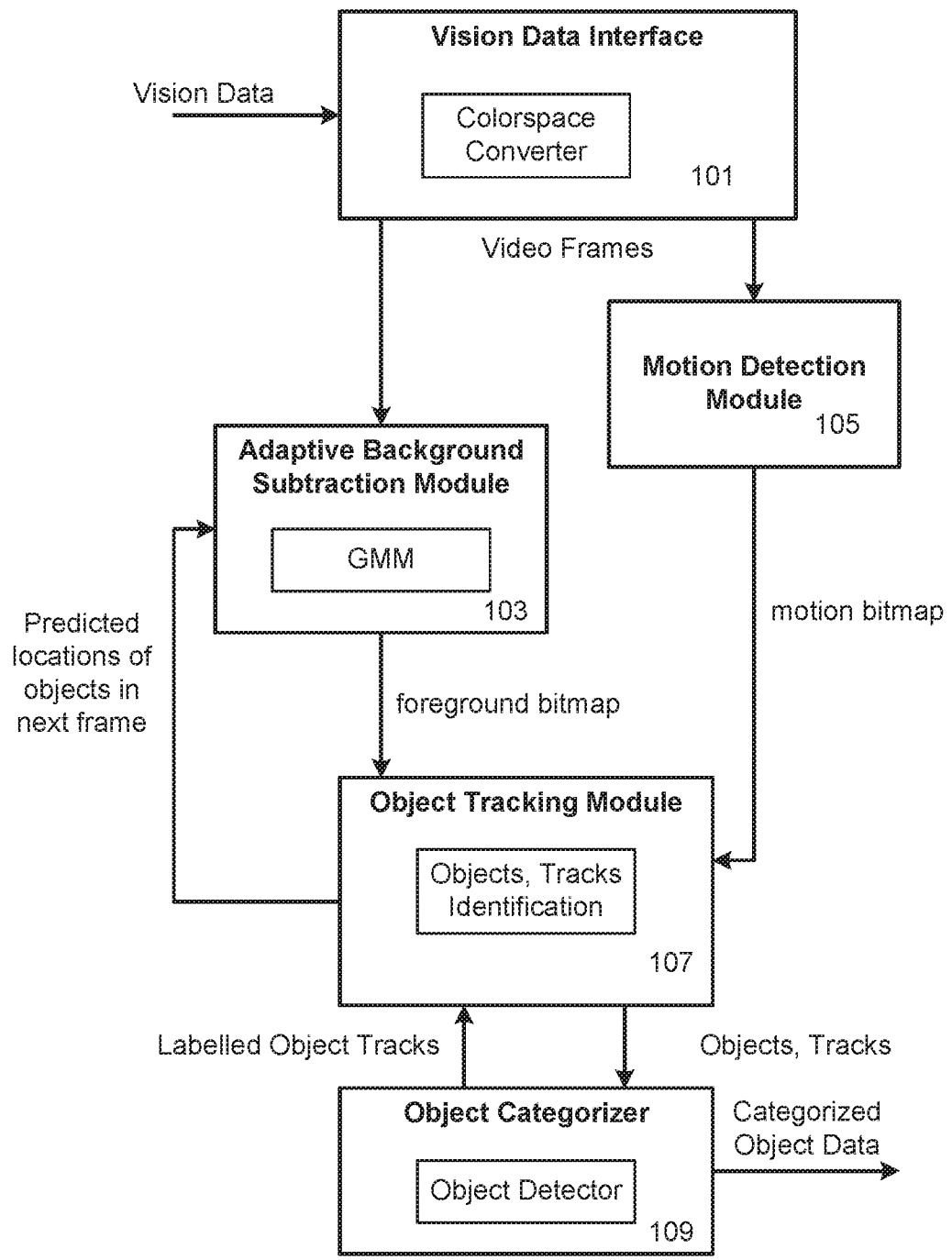
FIG. 1 is a block diagram of the computer vision pipeline.

FIG. 1 illustrates one exemplary embodiment for a computer vision pipeline to detect and track people and objects in video streams. The computer vision pipeline includes a vision data interface 101, an adaptive background subtraction module 103, an object tracking module 105, a motion detection module 107, and an object categorizer 109. The components of the system in FIG. 1 can be implemented through software, hardware, firmware, or various combinations of these. For example, the vision data interface could be an ASIC and the other elements implemented as software on a processor, with the whole system combined with other needed circuitry (power supply and so on) in single physical surveillance unit. The computer vision pipeline, or portions of it, can also be incorporated into systems such as the data enhanced video viewing system of the US patent application entitled "Data-Enhanced Video Viewing System and Methods for Computer Vision Processing" by Masood et al., filed the same day as the present application The system is designed to take in video streams, such as from cameras, process them using the pipeline and store the results at a desired location on the system, regardless of when, where, or which objects were tracked or detected. The pipeline can be wrapped in a user-friendly GUI interface that can be run on a home machine, such as a laptop or desktop, or it can also be ported to an embedded system. For example, this could be applied to give person (or other specific object) recognition capability to an available camera and digital signal processing (DSP) modules.

Vision Data Interface

The video data interface 101 accepts video input data, such as a series of video frames from a camera or a stream over an internet connection, and conditions the data into a format or formats conducive to vision computing if this is needed. For example, the video data interface might include a color space converter to convert the input vision data from a more traditional RGB color space to the YCbCr color space. Computer vision processing often will use the luminance (Y) channel and so the YCbCr color space, unlike the RGB, gives the freedom to use the luminance channel independently of the color channels. If the color space format of the received video frames is already in the desired color, then no conversion need be done, although in some embodiments multiple color space formats may be used at different points in the video processing pipeline. For Example, the YCbCr color space can be used for the adaptive background subtraction and motion detection modules while the object tracker and categorizer modules operate in the traditional RGB color space.

Adaptive Background Subtraction Module

The adaptive background subtraction module 103 distinguishes segments of moving regions in a sequence of video frames. Moving segments are of interest and considered as the foreground, whereas the stationary portions of the frame are the background. The main task of the adaptive background subtraction module is to compute the stationary background as a reference image and subtract the reference image from each frame. A binary segmentation of the stationary background and the moving foreground image can be then obtained. In this way, the moving foreground image can be efficiently singled out for further processing.

In one set of embodiments, a Gaussian Mixture Model (GMM) modeling scheme is employed to perform background subtraction. An example of such a scheme is disclosed in Friedman N., Russell S. *Image Segmentation in Video Sequences: A Probabilistic Approach. In The Thirteenth Conference on Uncertainty in Artificial Intelligence.* 1977. Brown University, Providence, R.I., USA: Morgan Kaufmann Publishers, Inc., San Francisco, 1997. Other examples of background subtraction methodologies that can be used include: Li Cheng, M. Gong, D. Schuurmans and T. Caelli, Real-time Discriminative Background Subtraction, IEEE Trans. Image Processing, 20(5), 1401-1414, 2011; and Pierre-Luc St-Charles, Guillaume-Alexandre Bilodeau and Robert Bergevin, Flexible Background Subtraction With Self-Balanced Local Sensitivity, IEEE Conference on Computer Vision and Pattern Recognition Workshops (CVPRW), 2014.

The pixel distribution or densities associated with various backgrounds in a frame is modeled by a linear combination of Gaussian distributions, with each Gaussian distribution defined parametrically by a mean and a variance. Thus, for example the intensity value of each background pixel is identified with one or more of the Gaussian distributions. The modeling is an iterative process that improves by learning and adapting frame by frame, over a series of frames. Conversely, the foreground pixels in the frame are identified by the ones that do not fit the modeling and are beyond a threshold distance from any of the Gaussian distributions.

The adaptive background subtraction module requires a certain number of video frames in order to initialize the GMM. For example, the first 50 frames may be used to initialize and train three or four Gaussian distributions in the mixture model. After training, the background subtraction module begins to output more reliable segmentation between background and foreground pixels. Once the foreground regions are extracted out, they are passed to the object-tracking module 107 for identification of "blobs" or objects and their associated tracks over a series of frames.

One of the problems with GMM based background subtraction is the manner in which moving object are handled when they become stationary for a decent amount of time. If the objects do not exhibit movement significantly different from the background model, the GMM learns these objects into the background. This creates problems if, say, two people come into the scene, walk up to each other, talk for a while, and then go their separate ways. If they stand together for some time with little motion (for example, just hand gestures, head movement, etc.), GMM will still learn them into the background. Hence, the system would lose track of the objects that become stationary.

Another use case in which the above-mentioned example could be used is to track objects when stationary, when there is no movement at all. Standard GMM alone is not capable of solving this problem as stationary objects are eventually learned into the background. Thus, the tracking module will lose people or other objects that come into the scene and remain stationary, as they no longer are part of the foreground.

Another example illustrates a converse problem caused by the delay in converging to a more accurate segmentation by the GMM scheme. In a video where an object is moving against a still background, the leading portion of the object gets delayed in being detected since there is a delay in learning the originally background pixels from foreground pixels.

The present adaptive background subtraction module employs GMM but with an additional adaptive feature that helps to improve background learning and enable faster adaptation. This is accomplished by having the adaptive background subtraction module also reference alternative segmentation data that is independently obtained in real-time from the motion detection module.

In one scheme, the alternative segmentation data is used directly to correct foreground/background segmentation from the adaptive background subtraction module. In the example where two people come together and remain stationary, the alternative segmentation data from the motion detection module will pick up slight movements and let the background subtraction know that there is motion. Additionally, it can keep the objects in foreground (for as long as needed) via a feedback system that tells the background model to learn the objects at a slower rate, (even potentially make it zero so they are never learned into the background). This way, moving objects that become stationary are not lost by the tracking module as the alternative segmentation data prevents them being learned into the background at the same rate as other things in the scene.

To solve tracking objects that are completely still, the system can make use of the feedback loop to alert the background model not to learn a specific object into the background for a specific amount of time (which could even be extended so that the tracker never loses the object while it is in view). Additionally, a requirement could be to keep track of different objects for different amount of time (people, pets, vehicles, etc.). This can be achieved by utilizing the label of the object, courtesy the Object Categorizer module in the pipeline, so that the system can track differently labeled objects for different amounts of time when stationary. The feedback loop plays a role by telling the GMM to learn objects into the background at different rates based on the label.

In another scheme, the alternative segmentation data is used indirectly to improve learning in the adaptive background subtraction module. The alternative segmentation data is first processed by the object tracking module 107 to estimate the future location of a given object. Essentially, a feedback list is updated by the object tracking module. The feedback list keeps track of the locations of tracked objects in the next frame based on a prediction model. The feedback list tells the adaptive background subtraction module where the objects are estimated to be in the next frame. This way the adaptive background subtraction module learns pixels of these objects into the background (i.e., categorize them as background) at a slower rate than normal.

Object Tracking Module

The object-tracking module 107 is responsible for associating detected objects across frames to achieve consistent labeling throughout a scene. It takes the segmentation data from the adaptive background subtraction module 103 and identifies and labels patches or "blobs" as objects and follows them across the frames.

Figure 2:
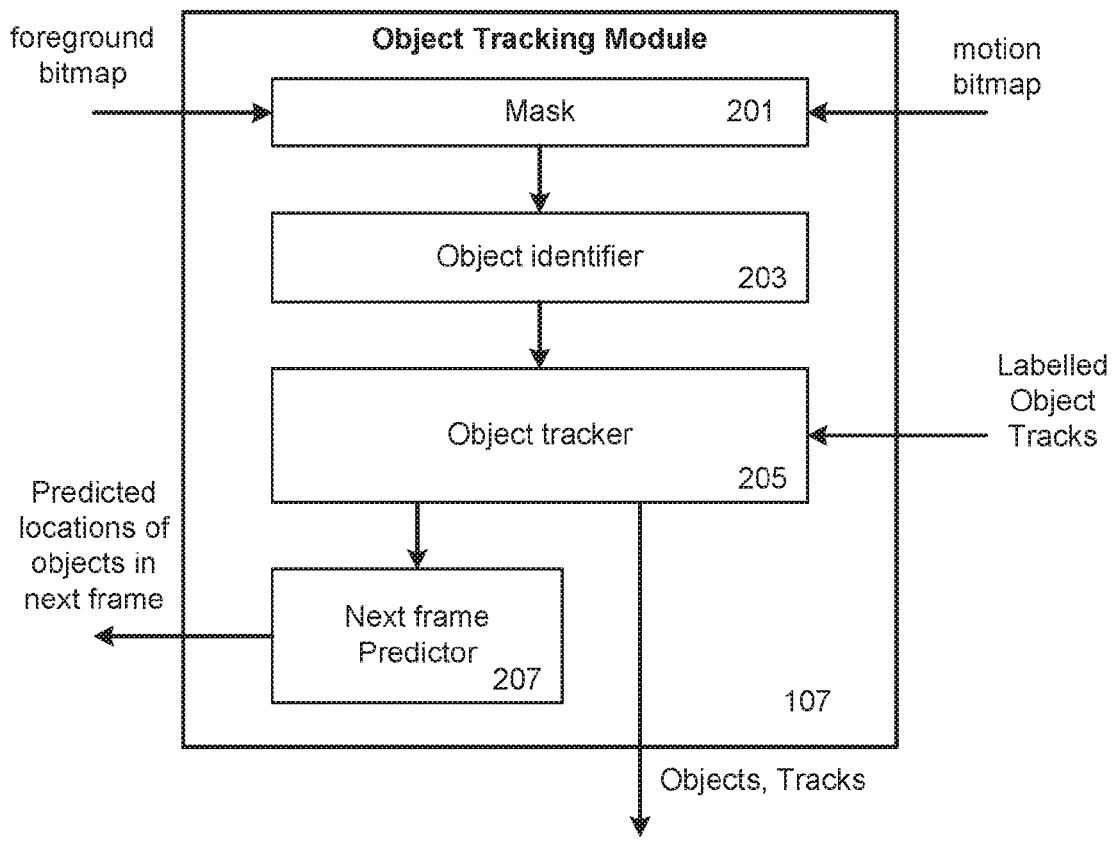
FIG. 2 provides some detail on an embodiment of an object tracking module.

FIG. 2 illustrates some of the main components of the object-tracking module in an exemplary embodiment. It comprises a mask 201, an object identifier 203, an object tracker 205, and a next frame predictor 207.

The mask 201 stores the foreground bitmap output from the background subtraction module 103 and has the ability to update portions of the bitmap using the motion bitmap output from the motion detection module 105.

The object identifier 203 identifies distinct blobs from the masked foreground data retrieved from memory on the system. It first finds new regions in the current frame. This can be accomplished by employing a conventional Connected Component algorithm, for example. The detected objects or blobs are each contained within a bounding box so that they can be simply tracked by the bounding box coordinates.

The object tracker 205 tracks each identified object across the frames. Given the detected regions in the current frame, the object tracker associates the present regions with those in the previous frame via spatial intersection of bounding boxes. Thus, intersecting-region associations give the new locations of previously tracked objects. Advantageously, this scheme maintains correct associations even when an object may be slightly occluded or region detection fails. For example, regions split by occlusion would still be associated to the correct object track from the previous frame. The labels of objects from the Object Categorizer module 109 can also be used as feedback to the Object Tracker 205 to make decisions on how long to keep tracking certain class of objects when they become stationary. The objects and tracks are then provided to the object categorizer 109.

The next frame predictor 207 predicts the locations of current regions in the next frame, and provides feedback to the adaptive background subtraction module 103. This allows pixels, which are predicted to be moving, to be learned into the background at a slower rate. The adaptive background subtraction module thus helps improve learning and adaptation.

The feedback loop is also used to keep track of moving objects for a certain amount of time even if they exhibit little to no motion. Additionally, different types of objects can be assigned different allowable tracking times when stationary. This can be accomplished by instructing the background subtraction module to learn stationary objects at different pace, based on the label assigned to the object.

Motion Detection Module

Figure 3:
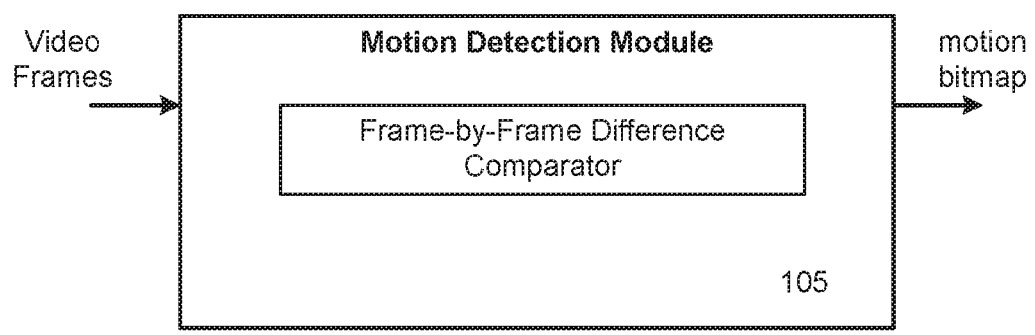
FIG. 3 provides some detail on an embodiment of a motion detection module.

The motion detection module 105 provides a basic understanding of which pixels are moving and which pixels are stationary based on a frame-by-frame comparison of pixel intensity values. It receives the video frames from the video data interface 101 in parallel with the adaptive background module 103 to provide the motion bitmap to the object-tracking module 107. FIG. 3 illustrates a main component of the motion detection module. It comprises a frame-by-frame difference comparator. The normalized frame-by-frame difference comparator computes the difference in each pixel's intensity from one frame to the next frame.

In the exemplary embodiment, each pixel is maintained in three categories, i.e. stationary pixel list (keeps track of how long, in frames, pixel has not moved), non-stationary pixel list (binary in nature, 0 if stationary and 1 otherwise) and motion pixel list (stores change in intensity).

The exemplary embodiment employs two thresholds to distinguish between pixel intensity changes: i.e. one threshold to classify stationary vs. non-stationary (STILL_THRESHOLD); and the second to differentiate low motion pixels from high motion pixels (MOTION_THRESHOLD). Each pixel is assigned an analog score normalized between MIN (e.g. 0) and MAX (e.g. 1), with MIN representing a stationary pixel and MAX representing a fully moving pixel. The scores in between MIN and MAX therefore represent varying degrees of motion.

Initially, all pixels are set to be stationary (i.e., score=MIN) for the first frame. For each subsequent frame, the change in intensity of each pixel relative to the previous frame is computed. For pixel intensity change below the STILL_THRESHOLD, the module can decay the intensity value in motion list (if not already zero) by DECAY_AMOUNT. The stationary list is incremented by 1. The pixel is marked as moving in the non-stationary list as long as stationary list count is below a predefined MAX_STILL_FRAMES threshold.

For pixel intensity change above the STILL_THRESHOLD, the module resets the stationary list and marks the pixel as moving in the non-stationary list. If intensity change is above the MOTION_THRESHOLD, it assigns MAX_MOTION_VALUE to the motion list; if not, the intensity value is decayed in the motion list (if not already zero) by DECAY_AMOUNT.

An example has the above variables as follows:

MAX_MOTION_VALUE=1
MOTION_DECAY_RATE=1000
MAX_STILL_FRAMES=FPS/2, where FPS is Frames Per Second
DECAY_AMOUNT=1/FPS
MOTION_THRESHOLD=DECAY_AMOUNT
STILL_THRESHOLD=MOTION_THRESHOLD/2

At any time, the motion detection module can output a bitmap indicating which pixels are moving and which pixels are still. As described earlier, this motion bitmap is employed by the tracking module 107 to help improve the segmentation results from the adaptive background subtraction module 103.

Figure 4:
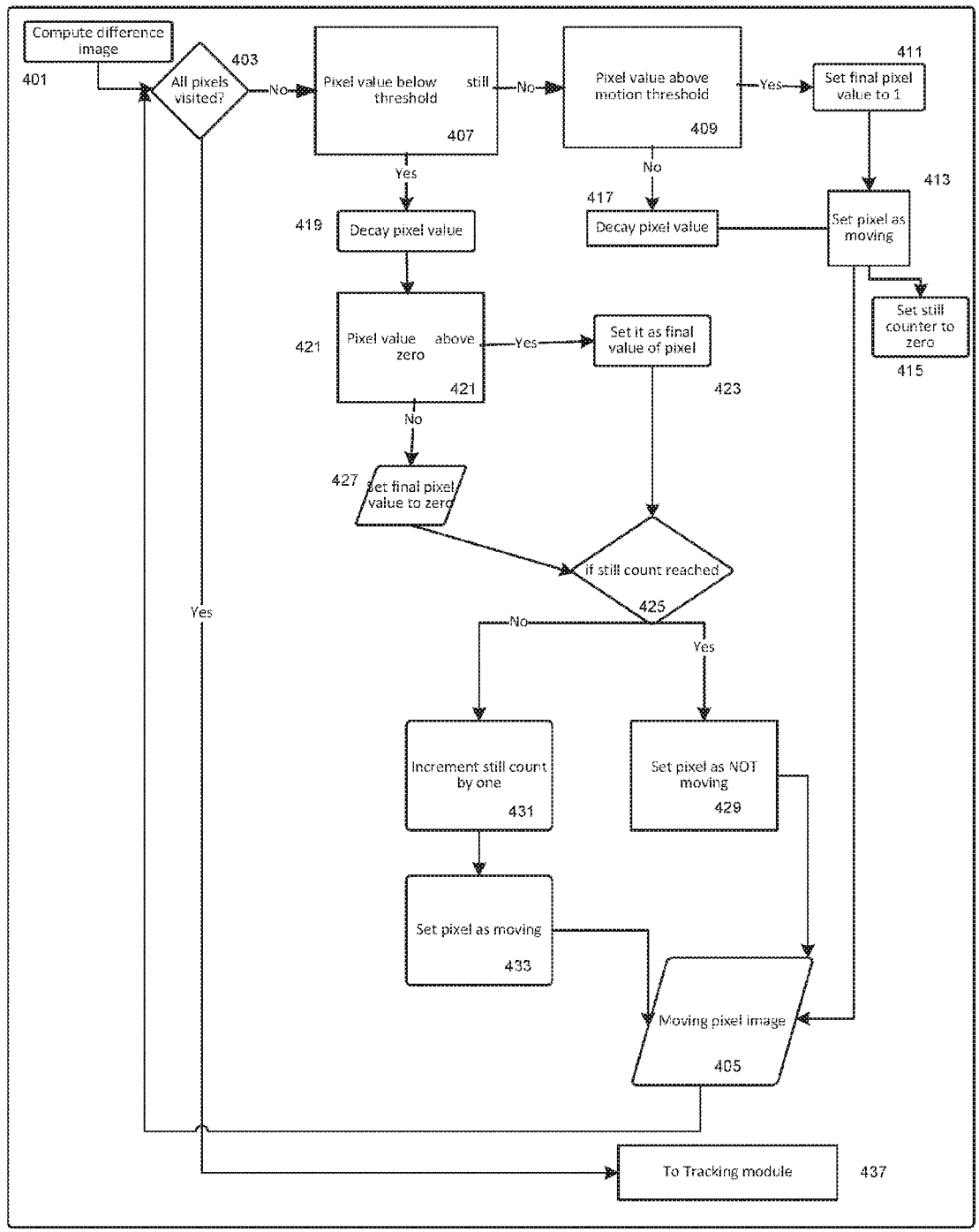
FIG. 4 is an exemplary flow chart for the operation of the motion detection module.

FIG. 4 illustrates a flowchart of the operations of the motion detection module for computing a difference image, beginning at 401. At 403, it is determined whether all of the pixels have been visited: if so, the Moving Pixel Image is sent to the Tracking Module at 437; if not, at 407 the pixel is checked against the STILL_THRESHOLD. If above the STILL_THRESHOLD at 407, it is compared to the MOTION_THRESHOLD at 409. If above the MOTION_THRESHOLD, the final pixel value in the motion pixel list is set to MAX_MOTION_VALUE at 411, the pixel set as moving in the non-stationary pixel list (set to 1) at 413. If the pixel value is below the MOTION_THRESHOLD at 409, the pixel value is decayed at 417 by DECAY_AMOUNT, before going on to 413. In either case, from 413 the flow goes to 405, with the still counter set to zero at 415. The still counter keeps tracks of how long a pixel value has been below STILL_THRESHOLD. This continues to be incremented until MAX_STILL_FRAMES is reached. At that point, the pixel is set as not moving (set to 0). The still counter is maintained separately in the stationary pixel list.

Returning to 407, if the pixel value is below the STILL_THRESHOLD the pixel value is decayed by DECAY_AMOUNT at 419. At 421 it is determined whether the pixel value is above zero: if so, the value is set at the final pixel value in the motion pixel list at 423; and if not, the final pixel value in the motion pixel list is set to zero at 427. In either case, at 425, the flow checks whether the still count has reached the MAX_STILL_FRAMES: If so, the pixel is set as non-moving in the non-stationary pixel list at 429 before going to 405; if not, the still count is incremented by one at 431 and the pixel set as moving in the non-stationary pixel list (set to 1) at 433, before going on to 405. From any of the routes, 405 then loops back to 403 to see if there are more pixels to visit.

Object Categorizer

The object categorizer 109 detects the objects identified in the object-tracking module 107 into any number of predetermined categories of objects. For example, one category of interest is a person. The detection techniques that can be used are what are known as the Histogram of Oriented Gradients (HOG) for detection of objects, using deep learned techniques, or other suitable techniques or combinations of techniques. The use of deep learning is described further in a provisional application entitled "Deeply Learned Convolutional Neural Networks (CNNs) for Object Localization and Detection" by Masood et al., filed on the same day as the present application, and in references cited therein. For purposes of discussion, when reference to a particular embodiment is needed for the Object Detector, an example based on the Histogram of Oriented Gradients (HOG) is used. This technique is disclosed in Navneet Dalal and Bill Triggs: Histogram of Orient Gradients for Human Detection, in IEEE International Conference on Computer Vision and Pattern Recognition (CVPR), June 2005. Other examples and implementations include: An HOG-LBP Human Detector with Partial Occlusion Handling. In IEEE International Conference on Computer Vision (ICCV), 2009; Face Recognition using Histogram of Oriented Gradients. In Pattern Recognition Letters, September 2011, vol. 32, No. 12; A Discriminatively Trained, Multiscale, Deformable Part Model. In IEEE International Conference on Computer Vision and Pattern Recognition (CVPR), 2008; and An Improved HOG based Pedestrian Detector. Advances in Intelligent Systems and Computing, 2014, Vol. 215.

More specifically, one exemplary object categorizer can be implemented as an HOG object detector with focus on both accuracy and on making it real-time. Significant improvement (using refinements and better methodologies) is achieved in both categories over the published techniques, which are not real-time and not as accurate. These additional features will be described below. Without loss of generality, the description will be focused on detecting objects that belong to the person category for the selected object category. This involves training the object detector to detect people.

Figure 5:
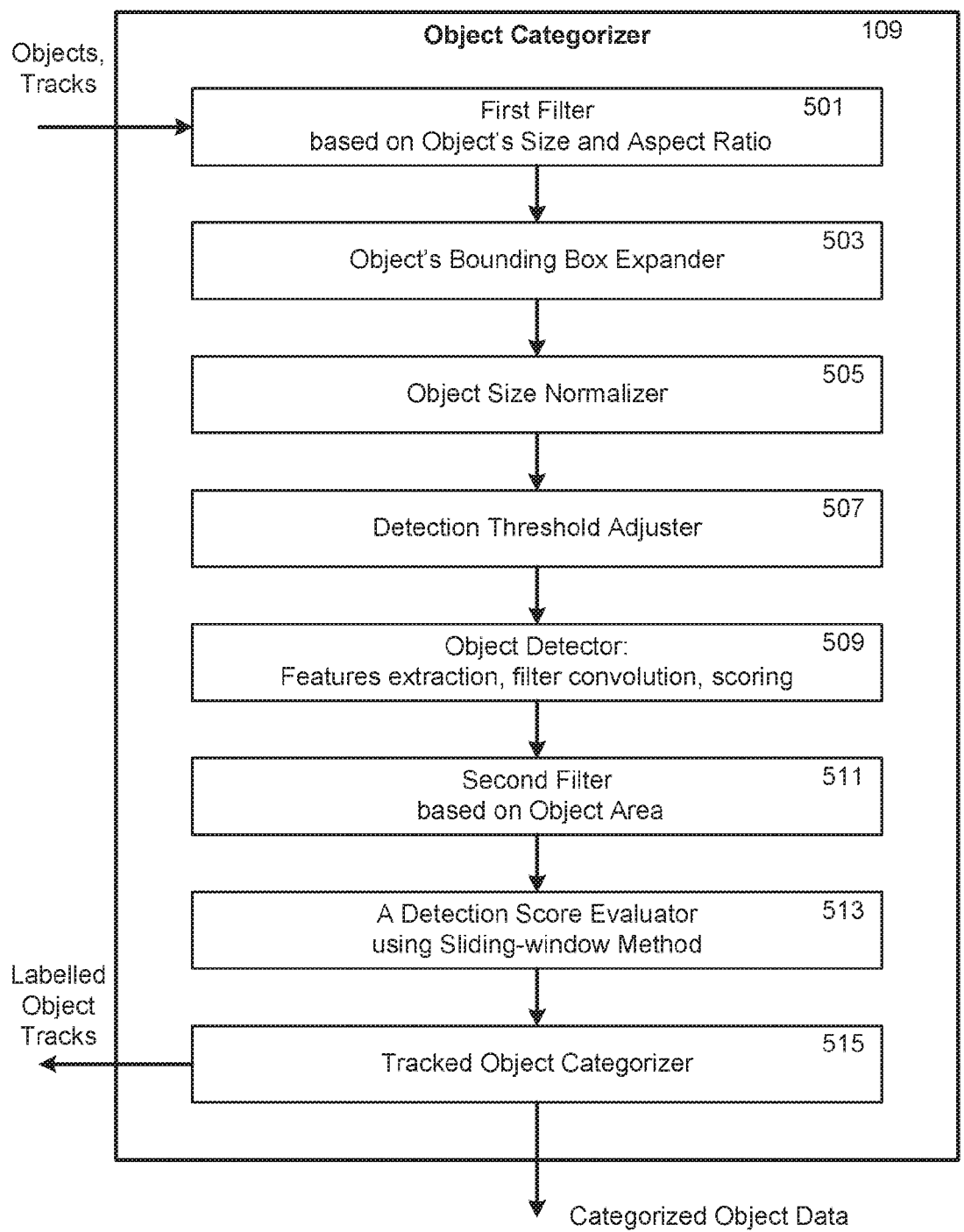
FIG. 5 provides some detail on an embodiment of an object categorizer.

FIG. 5 illustrates the components for an example of the object categorizer 105. For each object track, person detection is performed on each frame. These frame-level detection results are then combined to determine the final label of the whole object track. The main components of the object categorizer includes a first filter 501, an expander 503 for relaxing the object's bounding box, an object size normalizer 505, an adjuster 507 for the detection threshold, an object detector 509 for performing the main tasks of person detection in the objects, a second filter 511 based on the object area, a detection score evaluator 513 using sliding-window method and a categorizer 515 for a tracked object.

The object categorizer takes its input from the object-tracking module, which passes the identified objects and their tracks. For each object being detected in a given frame, it is checked to see if there is an existing track for the object (based on the object ID). If so, the new frame object information will be saved to that track. Otherwise, a new detection instance for the object is created.

Prior to starting the detection process by the object detector, the object's data is conditioned for optimum operation by the object detector. For this purpose, objects that do not satisfy a certain criterion to be a person are filtered out. The remaining objects are organized in a way that helps improve the detection accuracy.

The first filter 501 filters out an object deemed to be not a person or other selected category of object and sets the variable NON_PERSON_SCORE=−1. This can happens when:

1) The object exceeds a predetermined set of min/max dimensions. For example, a person object might have a MIN_HEIGHT (e.g. 12.5% of the frame height) and a MAX_WIDTH (e.g. 93.75% of the frame width); or 2) The object has an aspect ratio (height/width)<ASPECT_RATIO_THRESHOLD (e.g. 0.6) or 3) The object detection region exhibits high value for the mean contrast with dark edges and very little color information. This is especially useful for eliminating bright objects at night (e.g. spiders right in front of the camera lens because of the IR filter, car headlights, etc.) being triggered as people. Because these are nighttime scenes, the regions exhibit very bright regions at the center of the region while dark regions at the edges. Additionally, the object will display hardly any color information (will be mostly black and white) and so checking the hue channel of the region from the HSV (Hue, Saturation, Value) color space will give an added indicator to decide if the region contains people or not. In order to detect such cases, the system can also include the following steps:

1. Resize the object region using RESIZE_SCALE_FACTOR (e.g. 0.5) and use it to compute the following:
    a. Convert the object region from RGB color space to grayscale (img_resize_gray).
    b. Convert the object region from RGB color space to HSV color space (img_resize_hsv).
 2. Compute the region contrast:
    a. mean_contrast=mean((img_resize_gray−MID_PIXEL_VALUE)^2), where MID_PIXEL_VALUE is the mean value for range of pixels in the image (e.g. 128) or mean value of the region (e.g. mean(img_resize_gray)).
 3. Check the mean_contrast of img_resize_gray against the MEAN_CONTRAST_THRESHOLD (e.g. 4000). If above the MEAN_CONTRAST_THRESHOLD, it means that the region is of sufficiently high contrast. The next step is to check the mean of the edges and determine if they are dark.
 4. Compute the mean of the edges of the object region in img_resize_gray and check against the MEAN_EDGE_THRESHOLD (e.g. MEAN_EDGE_THRESHOLD=100). If below the MEAN_EDGE_THRESHOLD, it shows that the edges of the region contain dark pixel, which is most likely because of night. The next step is to check the mean of the region in hue channel of the HSV color space image (img_resize_hsv) and determine the color information.

5. Compute the mean of hue channel of the object region in img_resize_hsv and check against the MEAN_HUE_THRESHOLD (e.g. MEAN_HUE_THRESHOLD=0.15). If below the MEAN_HUE_THRESHOLD, it implies that the region is bordering on being colorless which is usually the case with spider or headlight triggers.
6. If all the above conditions are satisfied, we set the variable NON_PERSON_SCORE=−1. Otherwise, the object is not filtered out as a high contrast region.

The object's bounding box expander 503 then processes the remaining objects that have passed the first filter. Rather than have each tracked object that resulted from the object-tracking module being cropped out of a frame image and defined by a tight bounding box, the bounding box expander instead pushes out the bounding box relative to the object by a SIZE_INCREMENT (e.g., 25%) factor. In this way the expanded bounding box is more inclusive of any missing object parts relative to a tighter cropping. This is mainly done to avoid situations where the original bounding box does not encompass an important feature of a category of object, such as a person's head. Person detection is very much dependent on the head part, so that if the head is missing, the person may not be detected properly.

Once the bounding box relative to the object, which defines the search area for detection, has been optimally set, the size of the various objects found in a frame is normalized in block 505. The detection scoring method is dependent on the size of the object; for this reason, people further away from the camera appear smaller and hence sometimes fail to get detected.

The object size normalizer 505 optimizes the size of all the objects to be detected. An object is resized to be at least a predetermined percentage of frame height (e.g., 50% as set by the variable MIN_OBJ_HEIGHT). However, not all objects are resized. The criterion to determine if a small object is to be resized can depend on the aspect ratio: for example, in the person detection example, the object is resized if its height is greater than its width. This aspect ratio check helps in removing false positives such as cars and shadows. Additionally, there can be the option of scaling down objects that are larger than the resized height.

The detection threshold adjuster 507 adjusts the detection threshold depending on the resizing of the object. The detection threshold is the threshold score an object must have to be classified as a person (or other selected object category). This detection score is dependent on the size of the object (bigger objects get higher scores). Thus, it is usually not feasible to use an absolute threshold. An example of an adaptive threshold formula is as follows:

If the object has not been resized:

NON_RESIZE_THRESHOLD=original_threshold+ (3*object_height)/(5*frame_height)

If the object has been resized:

RESIZE_THRESHOLD=original_threshold+(object_height resized_height)^2/(125*frame_height)

After the area surrounding each object and the object's size have been optimized for object detector (or other used methodology, such as deep learning), it is now ready for object categorization, which in this example is person detection.

The object detector 509 is used to search each area defined by a bounding box in each frame to perform person detection. The object detector technique was originally designed to detect objects in a photo, so that the entire photo in a full screen is searched and processed.

Accordingly, the conventional object detector needs to use a significant number of scales to cover and search the objects in a full screen, which in turn makes it much slower than what is required in real-time applications.

However, in the exemplary embodiments, the execution speed of object detector is improved such that useful real-time applications are possible. The object-tracking module provides detected objects with a smaller bounding box than an entire frame in which to search for the desired object. There is no need to use all available scales that the original object detector uses. For example, use of only MIN_SCALES (e.g. $\frac{1}{8}^{th}$ of the total available scales) may be sufficient, yielding a significant N-fold (e.g. 8-fold) increase in performance. Thus, the execution speed of the object detector is greatly improved such that useful real-time applications are possible.

The object detector can first be trained as an object detector by learning through a set of exemplary objects of a selected category (object being person in this case). It identifies distinct features important for the specific object it intends to detect. It then learns a detector (which is simply a set of weights for the features) based on these features using a Support Vector Machine (SVM). Once trained, it can perform object detection using processing that includes features extraction and a series of filter convolutions. Each filter is designed to look for specific object attributes. Results from the filter responses are then accumulated to indicate the likelihood of the object being categorized as a person.

If the score is above the adaptive threshold and a second filter 511 is passed, then the object in this particular frame is categorized as of the selected category, such as a person, and the detection score is saved. Here, the second filter requires the final detection window covers at least MIN_AREA_THRESHOLD (e.g. 10% of the original object area).

To assign a label for an object, the system can use a range of frames, rather than just single frame detection. The maximum time before assigning a label for the object is MAX_DETECTION_TIME (e.g. 4800 ms). The system can also attempts to assign a label to the object at EARLY_DETECTION_TIME (e.g. 0.5*MAX_DETECTION_TIME) when it is confident that the object is one of the detection categories (e.g. 'person' for the exemplary embodiment). However, if the object leaves the scene before EARLY_DETECTION_TIME, a decision is made based on the available number of detections. If at any of these times more than a predetermined number of windows (as given by SW_MIN_LABEL (e.g. 25% of max possible sliding windows)) are labeled as person (or other specified category), the whole track will be labeled as "person" (or the other specified category).

Once the system decides to label an object track, it can also first check to make sure the object is not oscillating. This is an important check to remove false detections caused by tree leaves and/or their shadows in the wind, which could exhibit non-random oscillatory motion. To handle such cases, the system analyzes the movement of the object over the range of frames and determines if it moves significantly so as to not be classified as oscillating. One exemplary procedure is:

1) For the range of frames of the object track, compute the center location. Assuming a bounding box from the tracker with left corner (lx,ly) and right corner (rx,ry): center={lx+round((rx−lx)/2), ly+round((ry−ly)/2)}

2) Compute the variance of the center across the range of frames. If the variance across and both the X and Y directions is less than MAX_OSCILLATION_VARI-ANCE, the system considers the object to be oscillating and so marks it as being non-person.

A tracked object categorizer 513 gets the final label for an object track. The above processing is performed for a sample of frames. For example the object detector processing is performed on a selection of frames up to a desired determination point, such as a time threshold MAX_DETEC-TION_TIME (e.g. 4800 ms) in real-time applications or the end of the object's lifetime in post-processing scenarios. Detection scores are evaluated using a sliding window of size SW_SIZE (e.g., 0.1*MAX_DETECTION_TIME milliseconds), jumping every SW_INCREMENT (e.g. 300 ms). Thus, a sliding window can be expressed as SW= [n*SW_INCREMENT, n*SW_INCREMENT+SW_SIZE], where n=0, 1, 2, . . . . A label is assigned to each sliding window based on weighted averaging of scores across the sliding.

The weighted averaging is performed on the labels in the sliding window. For each label (label is either 0 or 1), the weight can be determined based on the absolute difference between the detection score and adjusted threshold for that particular frame:

scoreWeight=(|frameScore−frameThreshold|)

The average label is then computed by normalizing against the sum of the weighted label across a sliding window:

averageLabel=sum(scoreWeight*frameLabel)/sum(scoreWeight)

The averageLabel for the sliding window is checked against a TARGET_THRESHOLD (e.g. 0.5) to determine the final label for the sliding window.

Once a label is assigned for a particular object track, this information can be stored in a database with the object ID, frames it appears in, location per frame and the assigned label. Since the object has been labeled, there is no longer any need to run detection on this object; but it can still keep tracking the object as long as it is present in the scene and update any or all of the corresponding information stated above (except for the label). Also, once the object is labeled, this information is available to the tracker for it to make decisions on how long to keep track of certain class of objects when they go from moving to being stationary.

Another feedback loop that can be incorporated in the object categorizer is to determine sub-features of a selected category of object and, based on detecting a likely part of the object at 513, relaxing the threshold at 507 for the whole the object in subsequent frames. For example, the object categorizer can be used find a face within the object region. Since a face is a more reliable indicator and has less false triggers, the threshold for detecting people can be reduced in case there is confident face detection within the object region. Conversely, if the system is confident it has detected a person, the system can perform the same logic of reducing the threshold for detecting a face. The latter is more useful when the face is too small to be detected on its own. Hence, if the system has a confident person detection, the object region can be scaled up (to, say, twice the size) and try detecting the face again.

CONCLUSION

The foregoing detailed description of the invention has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

It is claimed:

1. A method of operating a computer vision system, the method comprising:
   receiving a set of vision data at a vision data interface and providing a series of video frames derived from the vision data;
   constructing from the series of video frames a motion bitmap at a motion detection module;
   constructing from the series of video frames a foreground bitmap at a background subtraction module;
   identifying one or more regions within the series of frames each corresponding to an object of a specified category and tracking the one or more regions across multiple frames of the series of video frames by an object tracking module from a comparison of the motion bitmap and foreground bitmap; and
   from the tracked regions, determining by an object categorizer module of whether each of the identified regions includes an object of the specified category.

2. The method of claim 1, wherein the regions within the series of video frames are each less than all of a frame.

3. The method of claim 1, further comprising:
   generating by the object tracking module of predicted locations within the series of frames for one or more of the identified regions; and
   providing the predicted locations to the background subtraction module, wherein the background subtraction module uses the predicted locations in constructing the foreground bitmap.

4. The method of claim 1, wherein providing the series of video frames derived from the vision data including converting a color space format of the vision data.

5. The method of claim 1, wherein the motion bitmap is constructed from a frame by frame difference comparison of the series of video frames.

6. The method of claim 1, wherein the foreground bitmap is constructed using a Gaussian mixture model modeling scheme.

7. The method of claim 1, wherein determining of whether each of the identified regions includes an object of the specified category uses a histogram of oriented gradients technique.

8. The method of claim 1, wherein determining of whether each of the identified regions includes an object of the specified category uses deep learning techniques.

9. The method of claim 1, wherein determining whether each of the identified regions includes an object of the specified category includes:
   filtering out of non-random oscillatory motion from the identified regions.

10. The method of claim 1, wherein determining whether each of the identified regions includes an object of the specified category includes:
    filtering out of high contrast areas from the identified regions.

11. The method of claim 10, wherein the filtering out of high contrast areas from the identified regions is performed using multiple color spaces.

12. The method of claim 1, wherein determining whether each of the identified regions includes an object of the specified category includes:
 determining that a first of the identified regions includes a portion of the object of the specified category, and, in response thereto, relaxing one or more criteria for determining whether the first of the identified regions include the object of the specified category.

13. The method of claim 1, further comprising:
 generating by the object categorizer module of category labels for objects of the specified category within the identified regions; and
 providing the category labels to object tracking module, wherein the object tracking module uses the category labels in tracking the regions.

14. A computer vision system, comprising:
 a vision data interface connectable to receive a set of vision data at and provide a series of video frames derived from the vision data;
 a motion detection module connected to the vision data interface to receive the series of video frames and construct therefrom a motion bitmap;
 a background subtraction module connected to the vision data interface to receive the series of video frames and construct therefrom a foreground bitmap;
 an object tracking module connected to receive the motion bitmap and the foreground bitmap and, from a comparison of the motion bitmap and foreground bitmap, identify one or more regions within the series of frames each corresponding to an object of a specified category and track the one or more regions across multiple frames of the series of video; and
 an object categorizer module to determine from the tracked regions whether each of the identified regions includes an object of the specified category.

15. The computer vision system of claim 14, wherein the regions within the series of video frames are each less than all of a frame.

16. The computer vision system of claim 14, wherein the object tracking module generates of predicted locations within the series of frames for one or more of the identified regions and provides the predicted locations to the background subtraction module, wherein the background subtraction module uses the predicted locations in constructing the foreground bitmap.

17. The computer vision system of claim 14, wherein in providing the series of video frames derived from the vision data, the vision data interface converts a color space format of the vision data.

18. The computer vision system of claim 14, wherein the motion bitmap is constructed from a frame by frame difference comparison of the series of video frames.

19. The computer vision system of claim 14, wherein the foreground bitmap is constructed using a Gaussian mixture model modeling scheme.

20. The computer vision system of claim 14, wherein determining of whether each of the identified regions includes an object of the specified category uses a histogram of oriented gradients technique.

21. The computer vision system of claim 14, wherein determining of whether each of the identified regions includes an object of the specified category uses deep learning techniques.

22. The computer vision system of claim 14, wherein determining whether each of the identified regions includes an object of the specified category includes filtering out of non-random oscillatory motion from the identified regions.

23. The computer vision system of claim 14, wherein determining whether each of the identified regions includes an object of the specified category includes filtering out of high contrast areas from the identified regions.

24. The computer vision system of claim 23, wherein the filtering out of high contrast areas from the identified regions is performed using multiple color spaces.

25. The computer vision system of claim 14, wherein determining whether each of the identified regions includes an object of the specified category includes determining that a first of the identified regions includes a portion of the object of the specified category, and, in response thereto, relaxing one or more criteria for determining whether the first of the identified regions include the object of the specified category.

26. The computer vision system of claim 14, wherein the object categorizer module generates category labels for objects of the specified category within the identified regions and provides the category labels to object tracking module, wherein the object tracking module uses the category labels in tracking the regions.

* * * * *